United States Patent
Blat

(10) Patent No.: US 7,170,945 B2
(45) Date of Patent: Jan. 30, 2007

(54) METHOD OF DETERMINING PARAMETERS OF AN OFDM SIGNAL AND ASSOCIATED RECEIVER

(75) Inventor: Hervé Blat, Chevaigne (FR)

(73) Assignee: Thomson Licensing, Billiancourt (FR)

( * ) Notice: Subject to any disclaimer, the term of this patent is extended or adjusted under 35 U.S.C. 154(b) by 757 days.

(21) Appl. No.: 10/332,691

(22) PCT Filed: Jul. 16, 2001

(86) PCT No.: PCT/FR01/02294

§ 371 (c)(1),
(2), (4) Date: Jan. 10, 2003

(87) PCT Pub. No.: WO02/07444

PCT Pub. Date: Jan. 24, 2002

(65) Prior Publication Data

US 2003/0156654 A1  Aug. 21, 2003

(30) Foreign Application Priority Data

Jul. 18, 2000  (FR) .................................. 00 09377

(51) Int. Cl.
- H04K 1/10 (2006.01)
- H04J 11/00 (2006.01)
- H04J 3/06 (2006.01)
- H04N 7/173 (2006.01)

(52) U.S. Cl. ...................... 375/260; 370/208; 370/516; 725/111

(58) Field of Classification Search ................ 375/260, 375/373; 370/516, 208; 725/111
See application file for complete search history.

(56) References Cited

U.S. PATENT DOCUMENTS 6,091,932 A * 7/2000 Langlais ..................... 725/111

(Continued)

FOREIGN PATENT DOCUMENTS

EP  0786889  7/1997

(Continued)

OTHER PUBLICATIONS

P.J. Tourtier et al "Multicarrier Modem for Digital HDTV Terrestrial Broadcasting" Signal Processing. Image Communication, NL, vol. 5, No. 5/06, Dec. 1, 1993, pp. 379-403.

*Primary Examiner*—Khai Tran
*Assistant Examiner*—Cicely Ware
(74) *Attorney, Agent, or Firm*—Joseph J. Laks; Ronald H. Kurdyla; Vincent E. Duffy

(57) ABSTRACT

The invention relates to a method of determining parameters of a signal of OFDM type in a receiver comprising a tuner and a demodulator, as well as such a receiver.

Figure 1A:
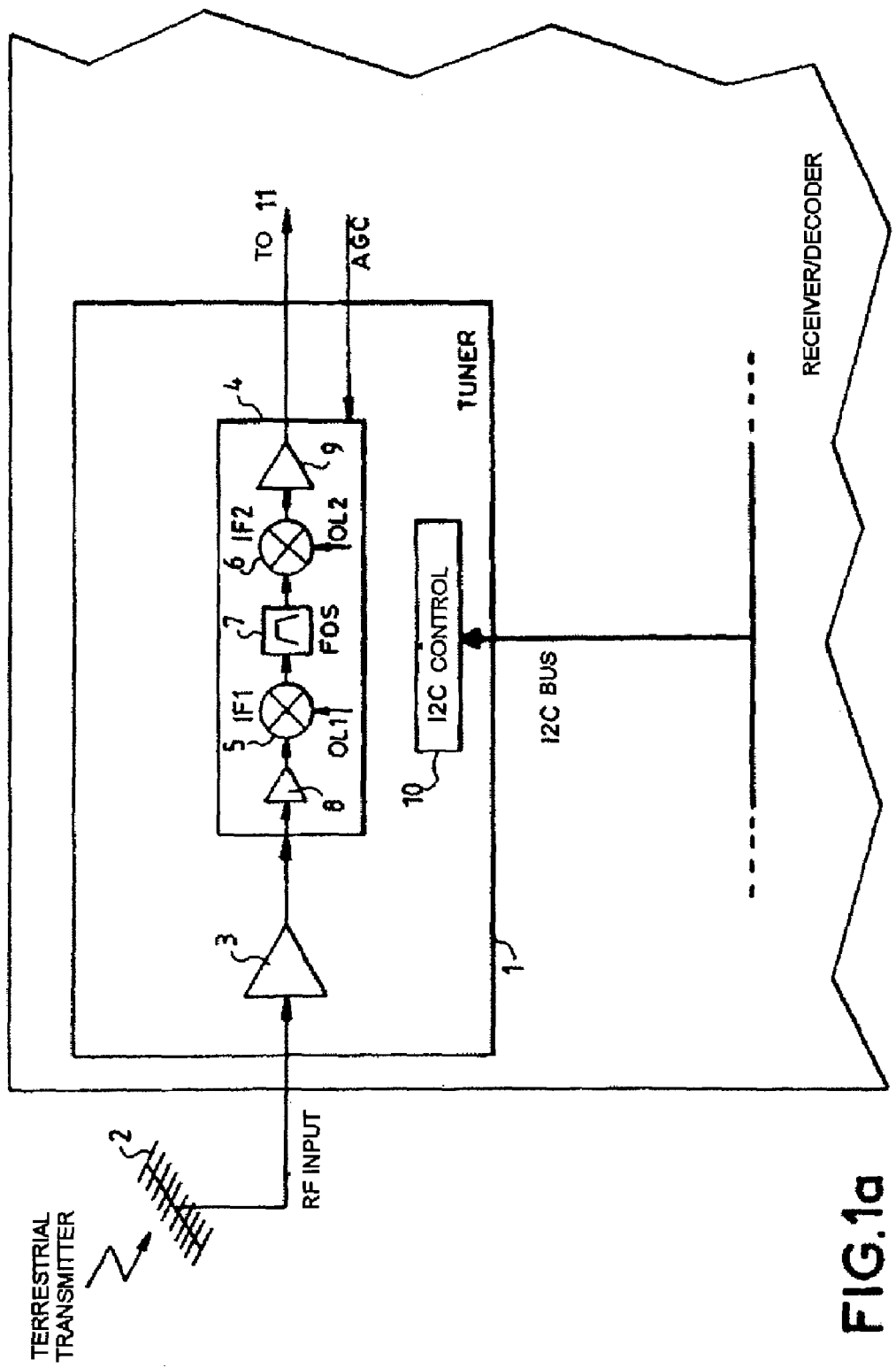

The method comprises the steps:
(a) programming the demodulator with a particular value of the FFT mode parameter;
(b) for this particular value of FFT mode parameter and a particular value of the guard interval, exhaustive variation of other parameters of the signal;
(c) verification of the absence of lock-on, even temporary, of the carrier recovery loop during the phase of variation;
(d) in case of absence of lock-on, repetition of the previous steps with another FFT mode;
(e) storage of the configurations of parameters corresponding to temporary lock-ons; and
(f) variation of the guard interval value for each of these configurations, until permanent lock-on of the carrier recovery loop is detected.

6 Claims, 6 Drawing Sheets

U.S. PATENT DOCUMENTS 6,172,993 B1 * 1/2001 Kim et al. .................. 370/516

6,449,245 B1 * 9/2002 Ikeda et al. ................. 370/208

FOREIGN PATENT DOCUMENTS

| EP | 0790722 | 8/1997 |
| EP | 0822715 | 2/1998 |

* cited by examiner

METHOD OF DETERMINING PARAMETERS OF AN OFDM SIGNAL AND ASSOCIATED RECEIVER

This application claims the benefit, under 35 U.S.C. § 365 of International Application PCT/FR01/02294, filed Jul. 16, 2001, which was published in accordance with PCT Article 21(2) on Jan. 24, 2002 in French and which claims the benefit of French patent application No. 00/09377 filed Jul. 18, 2000.

BACKGROUND OF THE INVENTION

1. Field of the Invention

The subject of the invention is a method for determining parameters of a signal of OFDM type in a receiver comprising a tuner and a demodulator. The invention applies in particular within the framework of an over-the-air/terrestrial broadcast digital television system.

2. Related Art

In a terrestrial digital television receiver, in particular of DVB-T type, the circuits of the input stage must, for a given reception frequency, determine a certain number of parameters of the incoming signal. Among these parameters are, in particular:
  the spectral inversion (or non-inversion),
  the number of carriers in a COFDM symbol,
  the duration of the guard interval between symbols, and
  the frequency shift ("offset" used by the programme broadcasters to distance the digital channels from adjacent analogue carriers).

According to the DVB-T standard, the number of possible values of each of these parameters are respectfully two, four and three. The receiver must thus test a maximum of 48 combinations of parameters, this corresponding on average to a success after 24 tries.

SUMMARY OF THE

The subject of the invention is a method of determining parameters of a signal of OFDM type in a receiver comprising a tuner and a demodulator, characterized in that it comprises the steps of:

(a) programming the subject of demodulator with a particular value of the FFT mode parameter;

(b) for this particular value of FFT mode parameter and a particular value of the guard interval, exhaustive variation of other parameters of the signal;

(c) verification of the absence of lock-on, even temporary, of the carrier recovery loop during the phase of variation;

(d) in case of absence of lock-on, repetition of the previous steps with another FFT mode.

It has been discovered that it is possible to detect the FFT mode (i.e. the number of carriers of an OFDM symbol), whatever the guard interval, by observing the state of the demodulator. The maximum number of configurations to be tested is thus reduced from 48 to 30, this corresponding on average to finding the right configuration in 15 tries.

Another subject of the invention is a receiver device implementing the detection method.

BRIEF DESCRIPTION OF THE INVENTION

Figure 1B:
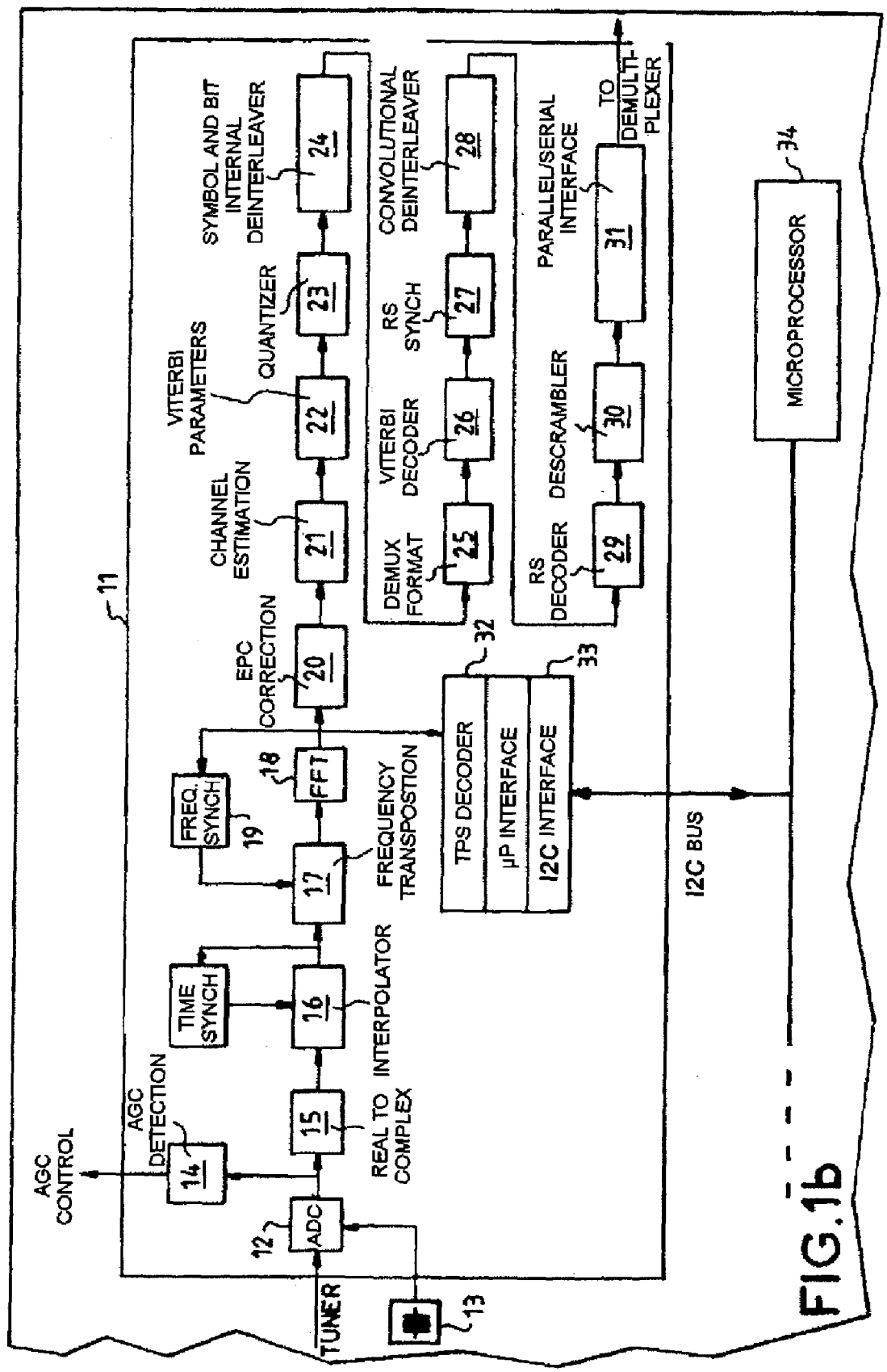
Figure 2:
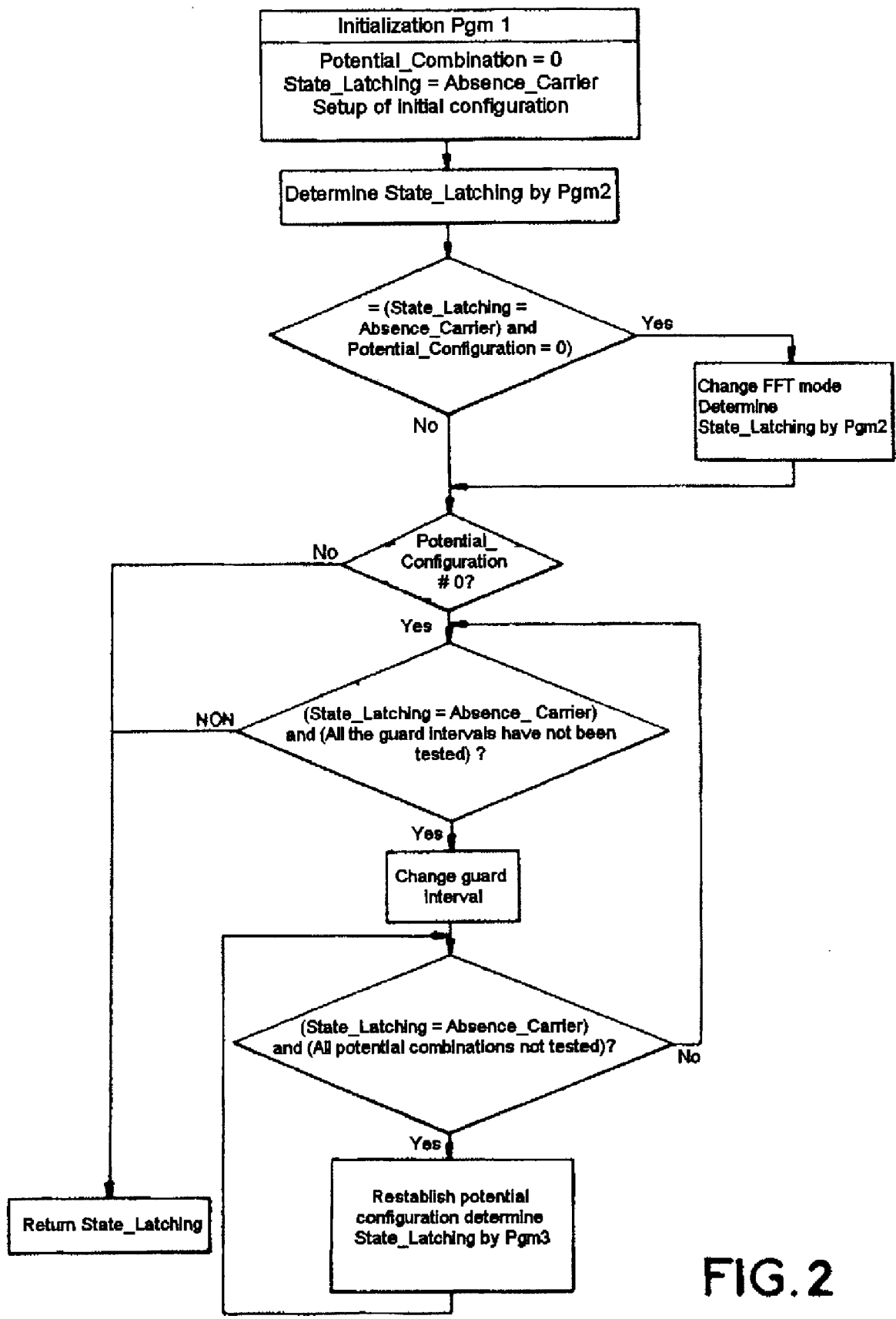
Figure 3:
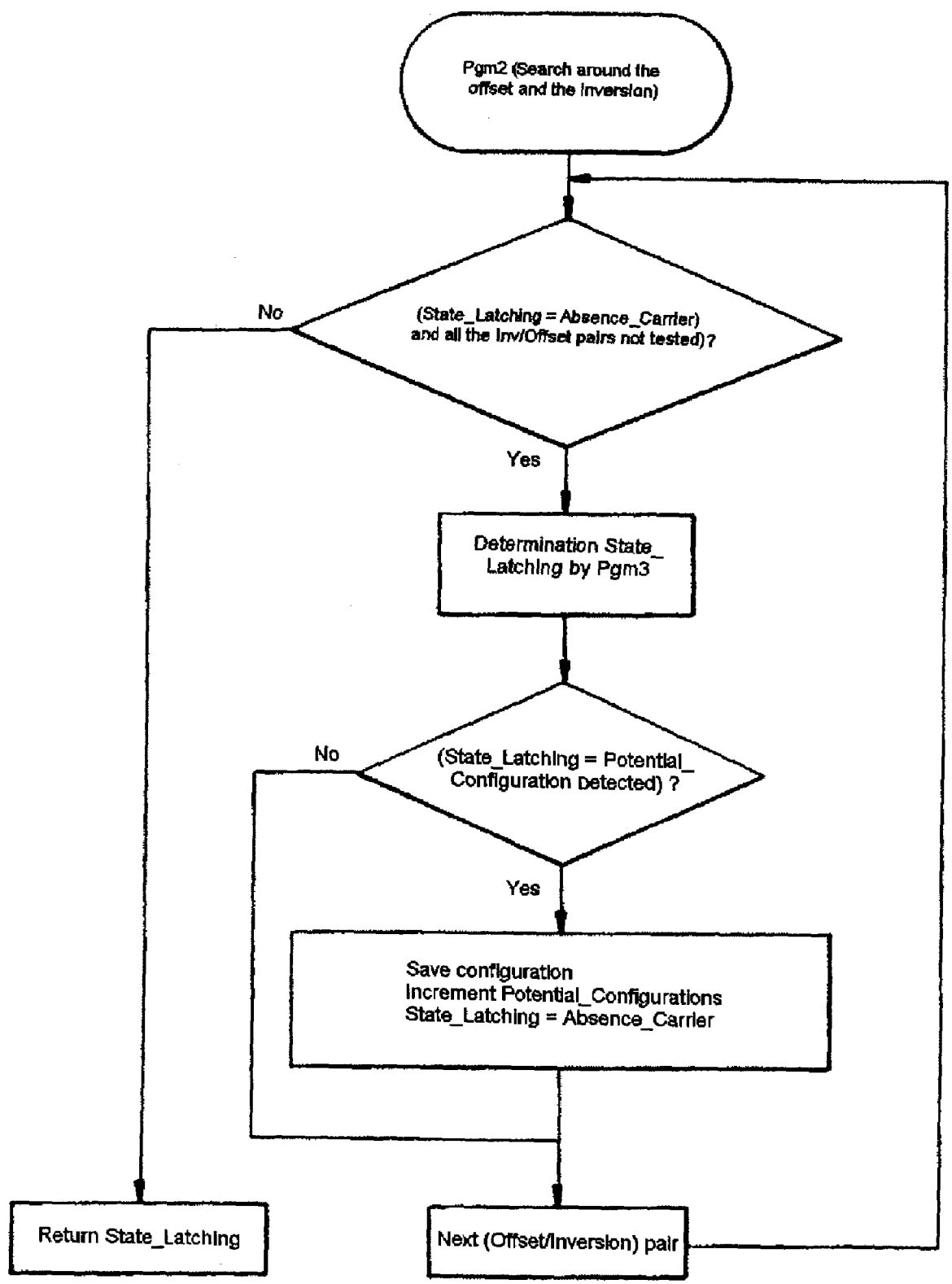
Figure 4:
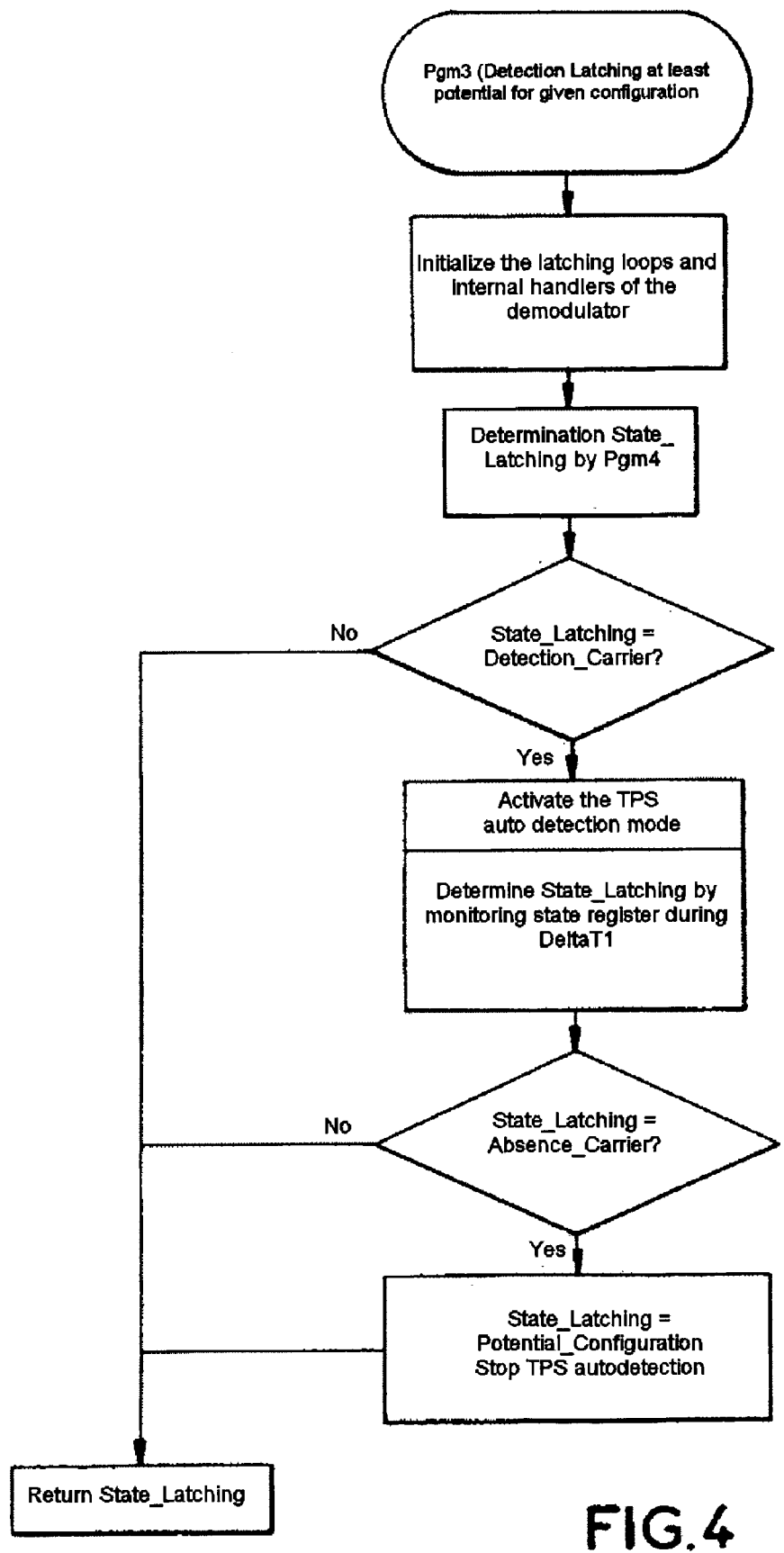
Figure 5:
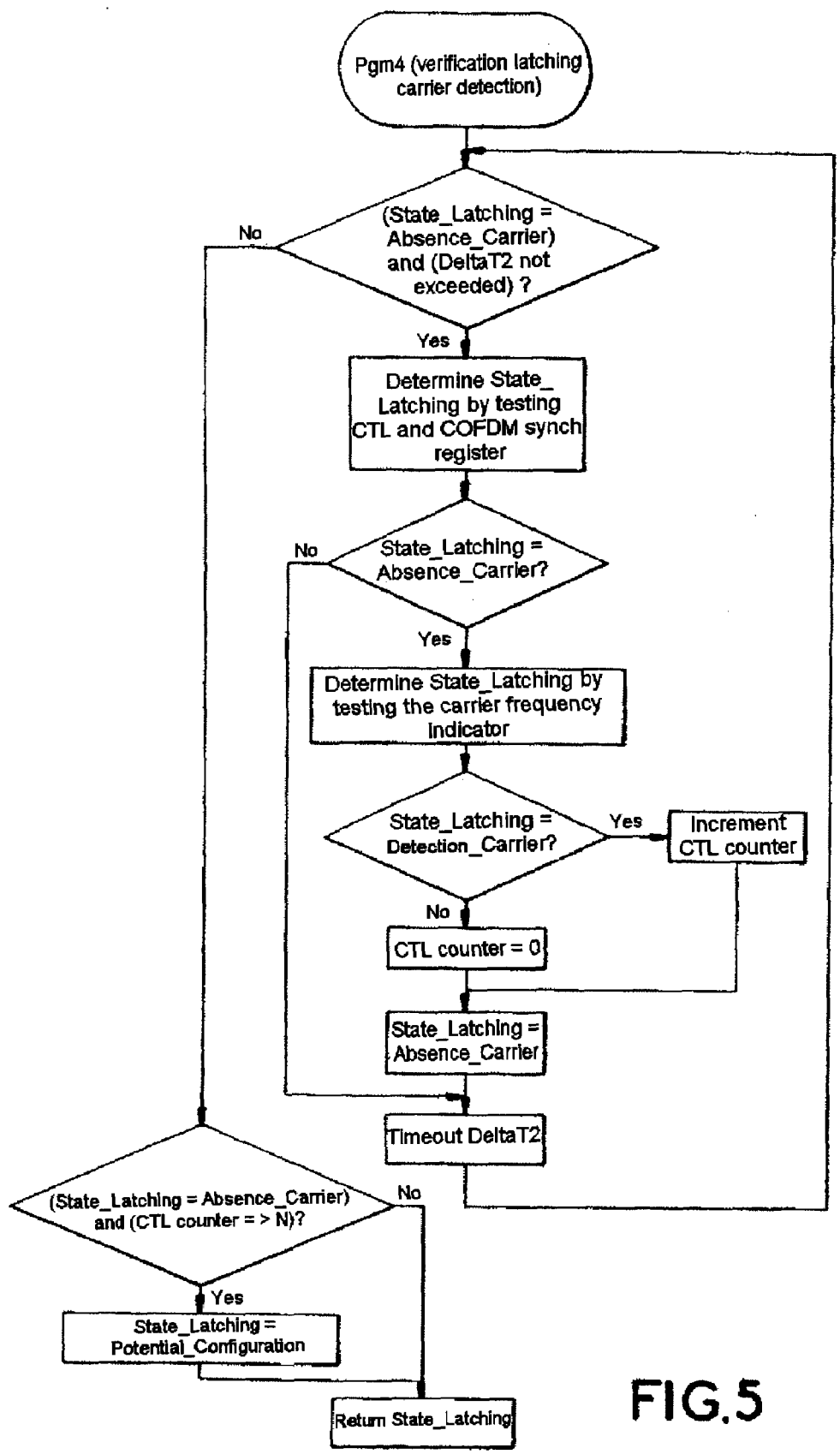

Other characteristics and advantages of the invention will become apparent through the description of a particular exemplary embodiment, illustrated by the appended figures in which:

FIGS. 1a and 1b represent a block diagram representing a tuner as well as a demodulator of a receiver in accordance with the invention, FIG. 2 is a flow chart of the main part ('Pgm1') of the method of determining parameters according to the exemplary embodiment, FIG. 3 is a flow chart of a part ('Pgm2') of the method of FIG. 2, which part is intended for varying the values of certain parameters and for verifying the at least potential lock-on for these combinations, FIG. 4 is a flow chart of a part of the method ('Pgm3') of FIG. 3, which part is intended for verifying the lock-on at least of the input stage for a given combination of parameters, FIG. 5 is a flow chart of a part ('Pgm4') of the flow chart of FIG. 4, which part is intended for verifying the lock-on of the demodulator.

DETAILED DESCRIPTION OF PREFERRED EMBODIMENTS

The tuner 1 of the receiver/decoder of FIGS. 1a and 1b comprises an input for a radio frequency (RF) signal, linked to a source 2. According to the present example, the environment in which the receiver/decoder is operating complies with the DVB-T standard (European Standard EN 300 744 published by the ETSI), and the source in this case is a terrestrial antenna. The input of the RF signal is linked to an amplifier 3, whose output is connected to a dual frequency conversion circuit 4. This circuit transposes the signal to a first intermediate frequency (signal IF1) by virtue of a first mixer 5 linked to a first oscillator (not illustrated), then to a second intermediate frequency (signal IF2) by virtue of a second mixer 6 linked to a second oscillator (likewise not illustrated). The signal IF1 is filtered by the intermediary of a surface wave filter 7 before the second transposition. The frequency conversion circuit furthermore comprises amplifiers referenced 8 and 9 respectively at input and output.

An automatic gain control (AGC) signal originating from the demodulator 11 adjusts in a manner known per se the input gain of the tuner so as to obtain an amplitude of the demodulator input signal compatible with the conversion span of the analogue/digital converter 12 of the demodulator.

Lastly, the tuner 1 comprises an interface 10 with an I2C bus of the decoder. This bus is linked to a microprocessor (not illustrated) of the receiver/decoder, and makes it possible to control the operation of the tuner by virtue of appropriate software.

The converter 12 of the demodulator is linked to an external oscillator 13. In a manner known per se, an AGC circuit 14 derives an appropriate gain control signal from the signals at the output of the converter. The digitized signal (still real at this level) is converted to complex form by a circuit 15, with the aim of preparing for the fast Fourier transform. An interpolator filter 16 resamples the signal with the aim of correcting certain clock drifts. A time synchronization circuit 35 controls the interpolation filter and determines the start of the window of the fast Fourier transform carried out by the FFT circuit 18, this window corresponding to an OFDM symbol. A frequency correction is carried out by a transposition circuit 17 before the switch to the frequency domain. This circuit is controlled by a frequency synchronization circuit 19 which analyses the signal in the frequency domain at the output of the FFT circuit 18.

Certain carriers of the OFDM symbol have a predefined frequency and a predefined power and serve to correct the common phase errors (CPE) of the signal (circuit 20). An estimation of the transmission channel and a corresponding equalization are carried out by the equalizer 21. The complex samples emanating from the equalizer are then processed by a circuit 22 to determine in a manner known per se decision parameters for the Viterbi decoder proper (see below). The samples are then quantized (circuit 23), deinterleaved (circuit 24), demultiplexed (circuit 25) in the format of the Viterbi decoder (circuit 26). The corrected data are analysed (reference 27) with the aim of determining the start of a Reed Solomon block, then the external deinterleaving is carried out (reference 28) before the Reed Solomon decoding proper (reference 29). The resulting data are descrambled (reference 30), the reverse process having been performed at the level of the transmitter for reasons of dispersion of the energy of the signal. Lastly, a section 31 makes it possible to obtain the data either in serial form, or in parallel form. The demodulator moreover possesses an interface for I2C bus.

The demodulator is for example the L64781 circuit from LSI Logic.

The decoder receiver moreover possesses a TPS (Transmission Parameter Signal) decoder 32 and an I2C bus interface 33, linking the tuner, the demodulator and a microprocessor 34.

The TPS decoder recovers the information carried by certain carriers of the signal received. This information, defined in the above cited DVB-T document, moreover comprises: the FFT mode (i.e. 2K or 8K), the modulation used (QPSK, 16-QAM or 64-QAM), whether the data are coded in normal or hierarchical mode with an additional parameter ('α'), the duration of the guard interval ($1/32$, $1/16$, $1/8$, $1/4$), as well as the Viterbi puncturing rate ($1/2$, $2/3$, $3/4$, $5/6$, $7/8$). This information can be recovered by the microprocessor 34. However, the TPS data cannot be extracted from the signal by the demodulator until the demodulator already possesses a certain number of parameters relating to the signal. The minimum parameters required by the demodulator to carry out lock-on of the signal for recovery of the TPS data are:

(a) the duration of the guard interval,
(b) the FFT mode,
(c) the spectral inversion or non-inversion
(d) any frequency shift ("offset") introduced by the transmitter.

Given that the position of the TPS carriers and the modulation employed for the TPS data are fixed and known in advance, these data may then be recovered without any problem.

The microprocessor must therefore determine the parameters (a) to (d). It is moreover assumed that the width of a channel is known in advance. According to the present example, it is fixed at 8 MHz.

One of the two FFT modes is chosen, and the demodulator is programmed accordingly. When the chosen FFT mode is not the mode of the signal received, then no lock-on of the carrier recovery loop (or 'CTL standing for "Carrier Tracking Loop") of the demodulator is possible. On the other hand, it has been discovered that when the right FFT mode is chosen, the demodulator will lock-on for certain configurations of the spectral inversion and frequency shift parameters, doing so whatever the value of the guard interval. It is this particular feature which makes it possible to reduce the number of total configurations to be tested.

The choice of the initial FFT mode for initiating the method may be arbitrary, or may be based on a statistical analysis of past lock-ons in one mode or in the other.

The following variables will in particular be employed in the description of the method:

A variable called 'State_Latching' is used to indicate whether a configuration of parameters allows latching or otherwise of the input stage, or whether the configuration could potentially give rise to latching, if the guard interval were chosen correctly. This first variable may have one of the three values: 'Absence_Carrier', 'Potential_Configuration_Detected', 'Detection_Carrier'.

A second variable called 'Potentials_Combination' gives, for a given FFT mode, the number of configurations of the (Spectral inversion, Frequency shift) pair potentially able to correspond to the configuration necessary for latching, following the analysis of the behaviour of the demodulator carrier recovery loop.

Main method ('Pgm1'):

FIG. 2 is a flow chart of the general method for determining the operating parameters ('Pgm1'). An initialization is firstly performed. The latter comprises the choosing of one of the two FFT modes, of a guard interval, of an inversion, of a shift, as well as of values for each of the other parameters (modulation, puncturing rate, etc). The demodulator circuit is programmed accordingly by the microprocessor.

For the chosen FFT mode, the routine Pgm2, seen in greater detail in relation to FIG. 3, reviews the various configurations of values of the (Spectral inversion, Frequency shift) pair and for each configuration determines whether there is lock-on or at least potential lock-on:

(a) If there is lock-on, signifying that the FFT mode and the guard interval which were initially chosen were correct, then the value returned for the variable 'State_Latching' is 'Detection_Carrier', the number of potential configurations is then irrelevant.

(b) If there is no lock-on, because the guard interval is not correct, the FFT mode being correct, the returned number of potential configurations will be non-zero and the value of the variable 'State_Latching' will be 'Absence_Carrier'.

(c) If there is no lock-on because the FFT mode is not correct, then the value of the variable 'State_Latching' will be 'Absence_Carrier' and the number of potential configurations will be zero.

On the basis of the above result, the method of FIG. 2 determines the course to be followed. In case (c), since the FFT mode initially chosen does not seem to be the right one, the entire procedure is begun again with the other FFT mode. Following this, one of cases (a) or (b) normally holds.

If case (a) holds, then there was lock-on and the correct configuration has been stored. The procedure is then terminated.

If case (b) holds, the guard interval is varied, and for each value of guard interval, latching is tested for one of the potential configurations previously stored, by way of the routine Pgm3 of FIG. 4.

To summarize, configurations are tested firstly while ignoring the guard interval and then, if necessary, the potential configurations are revisited while varying this interval.

Routine for varying the frequency shift and inversion parameters ('Pgm2'):

FIG. 3 represents the routine performing the latching tests for all the values of the (Inversion, Frequency Shift) parameter pair. For each pair of values, one determines whether there is latching or potential latching.

The FFT mode and guard interval parameters are not modified by this routine.

Firstly, a check verifies whether all the configurations of the pair have been tested and whether the latching state is indeed 'Absence_Carrier'. Specifically, if a latching ought to have taken place during one of the tests, then the loop would be exited forthwith.

The test loop itself begins by calling the routine 'Pgm3', which verifies lock-on of the CTL loop, then, if such lock-on is detected, the lock-on of the error correction part of the input stage. 'Pgm3' returns the value of the variable 'State_Latching' for a given configuration.

On the basis of the latching state returned by Pgm3, Pgm2 saves the configuration of the parameters if State_Latching indicates that this configuration will potentially give lock-on. In such a case, State_Latching is reset to the value 'Absence_Carrier', so that the main loop of Pgm2 continues to trawl through the various configurations.

Routine for detecting lock-on of the carrier recovery loop CTL and of the error correction part of the demodulation circuit ('Pgm3'):

Firstly, the microprocessor reinitializes all the recovery loops and internal handlers of the terrestrial demodulator. A new routine ('Pgm4') is then initiated. The latter determines, by virtue of certain state registers of the demodulation circuit, the state of the latching of the CTL part and returns the corresponding state of State_Latching. If a carrier has been detected at this level by Pgm4, then the routine Pgm3 pushes the investigation further, by activating the mode of automatic demodulation of the TPS carriers. This mode makes it possible to programme the demodulator with the data thus recovered. Once this automatic mode has been initiated, the microprocessor scans a state register of the demodulation circuit so as to verify that the synchronizations of the Reed-Solomon decoder 29 and of the descrambler 30 are effective. This verification is performed for a given time. The latching state is determined from this verification ('Presence_Carrier' if there is dual synchronization, 'Absence_Carrier' otherwise).

If there has been synchronization, the routine Pgm3 immediately returns this information to the routine Pgm2, in the form of the state 'Presence_Carrier'. If there has not been synchronization at the level of the error correction part, the state returned is finally 'Potential_Configuration'. The reason for this is that Pgm3 was initiated by Pgm2 following lock-on of the carrier detection part of the demodulator. Moreover, in the latter case, the TPS auto-detection stops since the configuration, although indicating that certain parameters have the right values, is not the sought-after final configuration.

Routine for detecting lock-on of the carrier recovery loop CTL ('Pgm4').

The flow chart of this routine is given by FIG. 5. The routine comprises a loop which is run through as long as a carrier has not been detected, at least sporadically, for a maximum waiting time of DeltaT2

This detection is performed in the following manner: the microprocessor monitors the state of one of the registers of the demodulator circuit to determine whether on the one hand there is synchronization of the demodulator on the COFDM frame, and whether on the other hand there is, at the moment of the test, latching of the carrier recovery loop (also called the Carrier Tracking Loop). In the case of the component used in the present example, the register concerned is the 'Performance Monitoring Register 1', located at the address 0×32, the two monitored bits being bits D2 and D3.

Detection is validated only if the synchronization of the demodulator on the TPS frame and the recovery of the carrier are valid simultaneously. In the converse case, the number of times the test relating to the CTL bit is positive consecutively for the interval duration DeltaT2 is counted up. Ultimately, the potential detection will be established if this counter is greater than or equal to a limit N, which is for example taken equal to 6.

The routine then returns the value of the variable State_Latched: i.e. 'Absence_Carrier' if the above criteria are not fulfilled, or 'Potential_Configuration' if these criteria are fulfilled.

It is clear that the invention applies also within frameworks other than that of DVB-T: for example in the case of a system where more than two FFT modes are used.

The invention claimed is:

1. A method of determining parameters of a signal of OFDM type in a receiver comprising a tuner and a demodulator, the method comprising the steps of:
   (a) programming the demodulator with a particular value of an FFT mode parameter;
   (b) for this particular value of FFT mode parameter and a particular value of a guard interval, exhaustive variation of other parameters of the signal;
   (c) verification of an absence of lock-on, even temporary, of a carrier recovery loop during a phase of variation;
   (d) in case of absence of lock-on, repetition of the previous steps with another FFT mode.

2. The method according to claim 1, wherein the parameters whose values are varied in step (b) are an inversion and a frequency shift.

3. The method according to claim 1, wherein the method furthermore comprises the steps of:
   (e) storage of configurations of parameters corresponding to temporary lock-ons, and
   (f) variation of the guard interval value for each of these configurations, until permanent lock-on of the carrier recovery loop is detected.

4. The method according to claim 3, wherein the method furthermore comprises the step of verification, for a configuration giving rise to a permanent lock-on of the carrier recovery loop, of a synchronization of at least one error correction module of an input stage of the receiver.

5. The method according to claim 1, wherein a detection of lock-on of the carrier recovery loop is carried out by a monitoring of state bits of the demodulator.

6. A device for receiving a signal of OFDM type, the said device comprising:
   a tuner;
   a demodulator which is linked to the tuner;
   means of programming the demodulator for a particular value of an FFT mode parameter of the signal;
   means of exhaustive variation of other parameters of the signal, for this particular value of EFT mode parameter and a particular value of a guard interval;
   means of verification of an absence of lock-on, even temporary, of a carrier recovery loop during a phase of variation and, in case of absence of lock-on, for repeating this process with another FFT mode.

* * * * *